May 18, 1926.
P. H. RIDGWAY
CLUTCH
Filed April 10, 1924    2 Sheets-Sheet 1
1,585,112
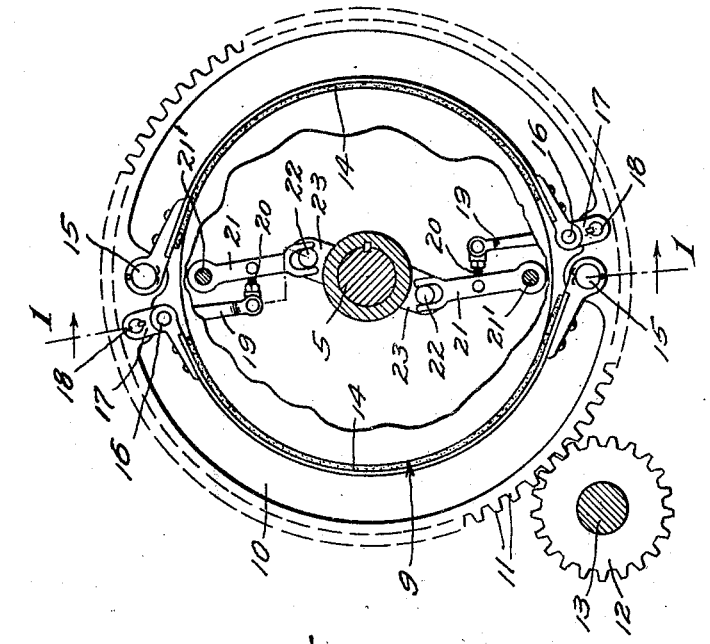
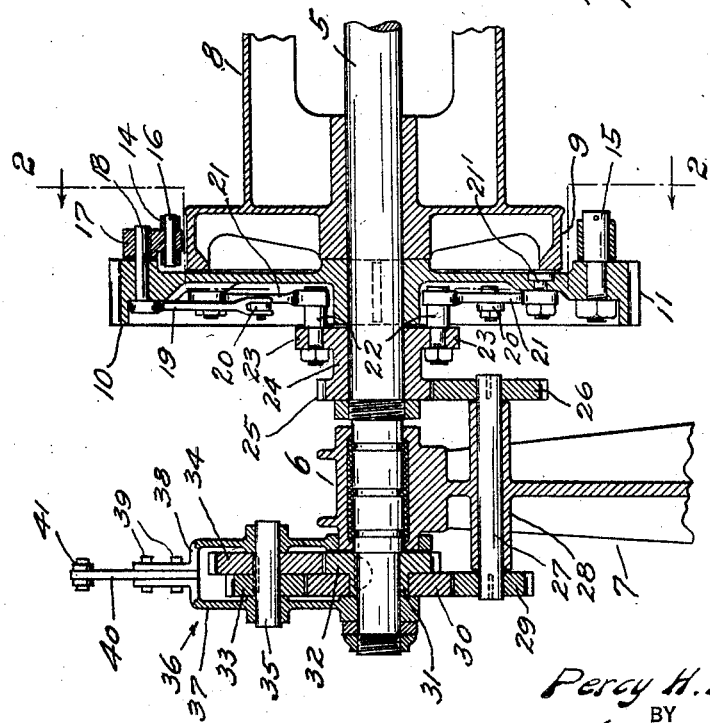
INVENTOR
Percy H. Ridgway
BY
Pierre Barnes
ATTORNEY

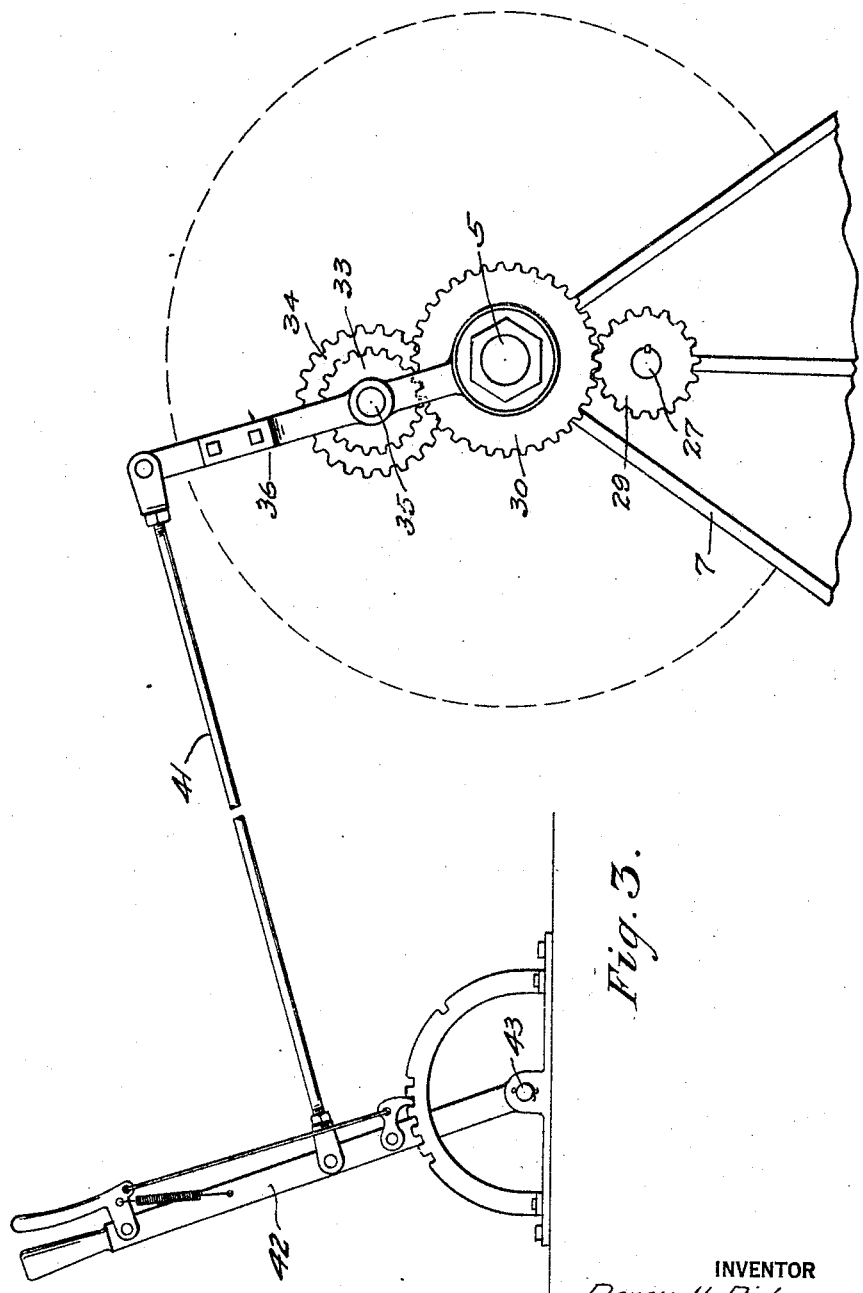

Patented May 18, 1926.

1,585,112

UNITED STATES PATENT OFFICE.

PERCY H. RIDGWAY, OF SEATTLE, WASHINGTON.

CLUTCH.

Application filed April 10, 1924. Serial No. 705,433.

This invention relates to clutches and more particularly to clutch-setting devices which may be used for various purposes, but is especially adapted for use in hoisting or hauling engines for controlling a clutch to couple or disengage selectively the drum thereof with or from a power driven shaft.

The object of the invention is to provide an efficient clutch-setting mechanism of the above character which will be compact and easily operated, and obviate the use of thrust pins or thrust sleeves hitherto employed in clutch setting operations.

With these ends in view the invention consists in the novel construction, adaptation, and combination of parts hereinafter described and claimed.

In the accompanying drawings,—

Figure 1 is a transverse vertical section, taken substantially on broken line 1—1 of Fig. 2, of a portion of a log-hauling engine with apparatus embodying the present invention applied thereto. Fig. 2 is a sectional view on broken line 2—2 of Fig. 1, and with the web of the driven wheel partly broken away to disclose the lever assembly employed in the operation of the clutch. Fig 3 is a side elevation of Fig. 1 and a manually actuated means for controlling the clutch.

In said drawings, the reference numeral 5 represents a shaft, hereinafter designated as the drum shaft, which is journaled in a bearing 6 of a standard 7 which constitutes a part of the frame of the engine or machine. Carried upon said shaft for independent rotary motion is a cable winding drum 8 having at one of its ends a peripheral flange 9. Keyed or otherwise rigidly secured to the drum shaft 5 is a wheel 10 provided with spur teeth 11 in mesh with the teeth of a spur pinion 12 (Fig. 2) upon a power driven shaft 13 whereby the wheel 10 and the drum shaft are rotated.

Preferably the drum clutch is applied to the outer circumferential surface of the drum flange 9 and, as illustrated, consists of two complementary clutch bands 14 connected from one end of each to studs 15 which are secured to the wheel 10 at diametrically opposite sides of the drum shaft. The other ends of the respective bands are connected to pin elements 16 of arms 17 which are carried by shafts 18 which are journaled in bearings provided in the wheel 10 and located in proximity of the aforesaid studs. As shown in Fig. 1, the shafts 18 extend longitudinally through said wheel and at the side of the wheel opposite the arms 17, the shafts 18 are each provided with an arm 19. The arms 19 are connected respectively by links 20 with levers 21 which are fulcrumed from an end of each to studs or bolts as 21¹ rigid with the wheel 10.

The other ends of these levers are slotted for engagement with pins 22 of arms 23 rigid with and extending from diametrically opposite sides of a hub 24 which is loosely mounted upon the drum shaft and between the wheel 10 and the shaft bearing 6. Said hub is provided with peripheral teeth 25 and constitutes a gear which is driven by engaging a gear 26 upon one end of a shaft 27 which extends through a bearing 28 of the standard 7 to receive a gear 29 at its other end.

Both of these gears 26 and 29 are keyed or otherwise rigidly secured to the shaft 27. The gear 29 meshes with a gear 30 which is rotatable loosely upon the drum shaft 5 or, as shown in Fig. 1, upon a bushing 31 provided by an extension or hub of a gear 32 which is rigidly secured as by means of a key to the drum shaft. Meshing with the gears 30 and 32 respectively are gears 33 and 34 which are secured as by means of a key to a shaft 35 which is journaled in a frame 36 arranged to be swung about the axis of the drum shaft.

The proportional sizes of the gears from 25—26, 29—33 and 34—32 are such that their relative speed ratios will be such that when actuated by the drum shaft the gear 25 will rotate at the same speed and coincidently with the drum shaft.

As shown, the frame 36 is formed of two parts 37 and 38 which are secured together as by means of bolts 39, the frame part 37 being journaled on the drum shaft and the other part 38 being journaled on a boss of the standard 7.

An extension 40 of the frame 36 may be employed as a handle for regulating the position of the frame to control the clutch mechanism as will presently be explained.

In Fig. 3, I illustrate the frame 36 connected by a reach rod 41 with an operating lever 42 fulcrumed at 43.

The operation of the invention is as follows: Assuming the drum shaft 5 is driven in either rotary direction, the wheel 10 and the gear 32 which are keyed to the drum shaft will rotate therewith. The gear 32 operating through the medium of the train of gears 34, 33, 30, 29 and 26 causes the gear 24 to rotate with the wheel 10.

When the frame 36 is swung about the axis of the drum shaft in one direction the gears 33 and 34 are given an orbital motion whereby the gear or hub 24 is rotated to revolubly move the arms 23 thereof causing the clutch operating mechanism 21, 19 and 17 to be actuated to apply the bands 14 to the drum 8 for coupling the latter to the wheel 10.

When the frame 36 is swung in the opposite direction the corresponding orbital movement of the gears 33 and 34 will result in disengaging the bands 14 from the drum to release the same with respect to the drum shaft.

More particularly, assuming the drum shaft 5 is rotated clockwise, the gear 32 which is keyed to said drum shaft rotates therewith clockwise to impart counter clockwise movement to the gear 34 and also to gear 33 which is coupled with the gear 34 to rotate therewith. Such counter clockwise motion of the gears 34 and 33, acting through the medium of the intermediate gear 30, imparts counter-clockwise motion to the gear 29. The latter is rigidly mounted upon an end of the shaft 27 having rigidly mounted upon its other end a gear 26 which constitutes the pinion for the gear element 25 of hub 24 whereby the counter-clockwise motion of such pinion 26 imparts continuous clockwise motion to said hub corresponding to the rotary direction in which is driven the drum shaft 5 and the wheel 10. By reason of the shaft 27 being journaled in a stationary bearing 28 and the shaft 35 being journaled in bearings of the frame 36 for orbital movement about the axis of the shaft 5, the swinging of said frame about such axis imparts movement to the gears 29 and 26 supplemental to the driving action of the prime mover gear 32 of the train of gears above mentioned.

Furthermore, the revolving or setting, of the gears 34 and 33 in the direction of rotation of the shaft 5, or the gear 32, advances rotatively the hub 24, while a revoluble setting of the gears 34 and 33 in a rotary direction opposite to that of the rotation of the gear 32 will cause the hub 24 to recede rotatively with respect to the shaft's rotation. By such an arrangement of the gears, the hub 24 may be regulated by adjustably moving the frame 36 to cause the clutch devices to be applied or disengaged selectively; but at all times, except during the setting of the frame controlled gears 34 and 33, the hub is rotated synchronously with the shaft 5 and its wheel 10 which carries the clutch devices. The adjusting of the revoluble positions of the gears 34 and 33, moreover, effect simply a temporary acceleration or reduction of the rotation of said hub and at other times, whether the clutch is engaged or disengaged, the clutch controlling hub 24 rotates in unison with the wheel 10 and the shaft 5.

While I have illustrated and described a specific application of the invention it is to be understood that I do not confine myself thereto as changes may be made without departing from the invention as defined in the appended claims.

What I claim, is,—

1. In mechanism of the class described, the combination with a shaft, a journal bearing therefor, clutch devices rotatable with the shaft, and a clutch member loosely mounted upon the shaft at one side of said bearing, of a system of gears operatively connecting said shaft with the clutch devices, and a frame rotatable about the axis of the shaft at the opposite side of the bearing from said clutch member for regulating the action of said system of gears to apply and disengage selectively the clutch devices with respect to said member.

2. In apparatus of the character described the combination with a driving shaft, a journal bearing therefor, a drum mounted loosely upon said shaft, said drum being provided with a frictional clutch element, a driving member rigidly mounted upon the shaft, a frictional clutch band and setting mechanism for controlling the same carried by said driving member, and a gear mounted upon said shaft for rotary motion relative thereto, said gear being operatively connected to said setting mechanism, of a gear rigidly mounted upon the shaft, said last named gear being located at the opposite side of said journal bearing from the driving member, a system of gears operatively connecting the aforesaid gears for normally rotating the first named gear coincidentally with the shaft and said driving member, said system of gears including two gears revoluble about the axis of the shaft, and means for regulating the revoluble positions of the two last named gears for adjusting the first named gear to a position to cause said setting mechanism to apply and disengage selectively said band with respect to the frictional element of said drum.

Signed at Seattle, Washington, this 11th day of March, 1924.

PERCY H. RIDGWAY.